United States Patent
Malouin et al.

(10) Patent No.: US 12,328,147 B2
(45) Date of Patent: Jun. 10, 2025

(54) SYSTEM, APPARATUS AND METHOD FOR OPTICAL INTENSITY MODULATION WITH DIRECT DETECTION USING LOCAL OSCILLATOR

(71) Applicant: Intel Corporation, Santa Clara, CA (US)

(72) Inventors: Christian Malouin, San Jose, CA (US); Jin Hong, Saratoga, CA (US); Wenhua Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 735 days.

(21) Appl. No.: 17/353,853

(22) Filed: Jun. 22, 2021

(65) Prior Publication Data

US 2021/0314068 A1    Oct. 7, 2021

(51) Int. Cl.
*H04B 10/61* (2013.01)
*H04B 10/69* (2013.01)

(52) U.S. Cl.
CPC ........... *H04B 10/616* (2013.01); *H04B 10/65* (2020.05); *H04B 10/69* (2013.01)

(58) Field of Classification Search
CPC ...... H04B 10/616; H04B 10/65; H04B 10/69; H04B 10/278; H04B 10/524; H04B 10/613
USPC ........................................................ 398/202
See application file for complete search history.

(56) References Cited

U.S. PATENT DOCUMENTS

| | | | |
|---|---|---|---|
| 8,331,805 B2 * | 12/2012 | Nakashima | H04B 10/6165 398/208 |
| 9,225,433 B1 * | 12/2015 | Hueda | H04B 10/6165 |
| 10,560,194 B2 | 2/2020 | Zhang et al. | |
| 10,727,640 B2 | 7/2020 | Sun et al. | |
| 10,833,769 B1 * | 11/2020 | Le | H04B 10/07955 |
| 2004/0246048 A1 * | 12/2004 | Leyonhjelm | H03F 1/3247 330/2 |

(Continued)

FOREIGN PATENT DOCUMENTS

| | | | | |
|---|---|---|---|---|
| CN | 101257349 A | * | 9/2008 | ............. H04B 10/61 |
| CN | 20210076908 A | * | 6/2021 | ......... H03H 21/0012 |

(Continued)

OTHER PUBLICATIONS

Di Che, et al.; Linearization of Direct Detection Optical Channels Using Self-Coherent Subsystems; Journal of Lightwave Technology, vol. 34, No. 2, Jan. 15, 2016; pp. 516-524.

Antonio Mecozzi, et al.; "Kramers-Kronig Coherent Receiver," Optical Society of America, 2016, pp. 1220-1227.

(Continued)

*Primary Examiner* — Jai M Lee
(74) *Attorney, Agent, or Firm* — Essential Patents Group, LLP (57) ABSTRACT

In one embodiment, an apparatus comprises: a coherent optical receiver front-end circuit to receive an optical signal comprising information and further to receive a local oscillator optical signal, and output an orthogonal electrical signal based on the optical signal; a processing circuit coupled to the coherent optical receiver front-end circuit to receive the orthogonal electrical signal and process the orthogonal electrical signal to generate therefrom sum of squares information; and a non-coherent receiver coupled to the processing circuit to recover the information from the sum of squares information. Other embodiments are described and claimed.

15 Claims, 5 Drawing Sheets

(56) References Cited

U.S. PATENT DOCUMENTS

| | | | | |
|---|---|---|---|---|
| 2005/0271164 | A1* | 12/2005 | Moulthrop | H04L 27/3818 |
| | | | | 375/332 |
| 2006/0285578 | A1* | 12/2006 | Weisenhorn | H04B 1/7183 |
| | | | | 375/130 |
| 2010/0303474 | A1* | 12/2010 | Nakashima | H04B 10/6165 |
| | | | | 398/208 |
| 2017/0026134 | A1* | 1/2017 | Ciaramella | H04B 10/6166 |
| 2020/0366379 | A1* | 11/2020 | Jafari | H04B 10/614 |
| 2021/0006044 | A1 | 1/2021 | Hong et al. | |
| 2021/0057880 | A1 | 2/2021 | Mehta et al. | |
| 2021/0135762 | A1* | 5/2021 | Zhou | H04B 10/63 |

FOREIGN PATENT DOCUMENTS

| | | | | |
|---|---|---|---|---|
| CN | 114915349 A | * | 8/2022 | H04B 10/6165 |
| JP | 2256960 B1 | * | 5/2010 | |

OTHER PUBLICATIONS

Innolume GmbH, LD-310-COMB-8 Fiber coupled Comb Laser Diode @ 1310nm, 4 pages.

Hao Li et al., A 3-D-Integrated Silicon Photonic Microring-Based 112-GB/s PAM-4 Transmitter With Nonlinear Equalization and Thermal Control, IEEE Journal of Solid-State Circuits, vol. 56, No. 1, Jan. 2021; pp. 19-29.

Xu Wang et al., Precise control of the coupling coefficient through destructive interference in silicon waveguide Bragg gratings, Optic Letters, vol. 39, No. 19, Oct. 1, 2014, pp. 5519-5522.

Intel Corp, 100G Parallel Single Mode Data Center Connectivity, May 2017, 1 pg.

John Williamson, Silicon Photonics Passes the Tipping Point, Optical Connections News, Issue 11, Q4 2017, pp. 28-29.

Robert Blum, Silicon Photonics the Key to Data Centre Connectivity, Optical Connections News, Issue 10, Q3 2017, 2 pgs.

Intel Corp, U.S. Appl. No. 17/337,479, filed Jun. 3, 2021, entitled Multi-Wavelength Distributed Feedback Laser, 31 pgs.

* cited by examiner

SYSTEM, APPARATUS AND METHOD FOR OPTICAL INTENSITY MODULATION WITH DIRECT DETECTION USING LOCAL OSCILLATOR

BACKGROUND

Data Center (DC) applications for optical short reach transmission require cost-effective and low electrical power consumption solutions. Most commercial DC systems use conventional optical Intensity Modulation with Direct Detection (IM-DD). To meet demand for faster data rates, higher modulation formats such as Pulse Amplitude Modulation (PAM) have been proposed. In recent years, PAM-4, which encodes 4 levels (or symbols) with 2 bits per symbol, has become the predominant modulation format. The main advantage of PAM-M, where M is the order or number of symbols, is that the symbol rate scales down by M to achieve the same total bit rate. However, the required electrical Signal-to-Noise Ratio (SNR) increases with M. This fact leads to more optical power required from a laser, and may be a limiting factor in increasing data rates in optical communication systems.

DETAILED DESCRIPTION

In various embodiments, an optical communication system may incorporate receiver circuitry that combines both coherent and non-coherent aspects to enable high data rates at reduced power.

In optical communication, an optical receiver performs a coherent detection operation where a received optical signal beats with a laser located on the receiver (called a local oscillator (LO)). This operation maps amplitude and phase of the signal electric field. This full recovery of the electric field enables the possibility of compensating linear effects like Chromatic Dispersion (CD) and Polarization Mode Dispersion (PMD). With this ability to compensate linear effects, typical coherent receivers digitize the data and hence use Analog-to-Digital Converters (ADC) and Digital Signal Processing (DSP) blocks. One DSP function is the retrieval of the signal and LO beating phase (both signal and LO lasers have random time fluctuating phases). Another DSP function is a CD filter, which takes up a large amount of the overall DSP gate count. Therefore, coherent detection as implemented with a DSP can be extremely complex and may not meet the cost and electrical power consumption requirements of DC applications.

In embodiments, the simplicity of a PAM-M transmitter and receiver is combined with a coherent front-end (LO and optical hybrid) receiver. With this arrangement, LO power is transferred to the incoming optical signal via the optical hybrid. The signal-LO beating from photodiode square law detection results in orthogonal (I and Q) signals. These signals in turn may be squared and summed (via so-called signal-square sum circuitry or function). In this case, the strength of $I^2+Q^2$ is proportional to the product of $P_s P_{LO}$, where $P_s$ and $P_{LO}$ are the optical powers of the signal and LO respectively.

Note that with a receiver arrangement in accordance with an embodiment, an optical system may implement an IM-DD transmitter. Since the optical loss of such IMDD transmitter is much less than a conventional coherent transmitter, overall power consumption may be reduced. This is so, since a typical coherent transmitter usually uses two nested optical Mach-Zehnder modulators biased at the null of transmission to encode the phase of the signal, which can be very lossy. Typically, the loss of a coherent transmitter is 10 dB (factor of 10 linear) more than the loss of an IMDD transmitter. Therefore, the optical average power at the output of a coherent transmitter is nominally 10 dB lower than that of an IMDD transmitter.

In embodiments, deterministic phase retrieval may not be implemented, as it may not be needed to achieve high SNR in short fiber link DC applications where the CD and PMD have little impact on system performance. As a result, the simplicity of PAM-M transmission may be realized together with power transfer from the LO to the signal in a front-end coherent receiver, without any analog or DSP processing blocks conventionally used in coherent detection.

Figure 1:
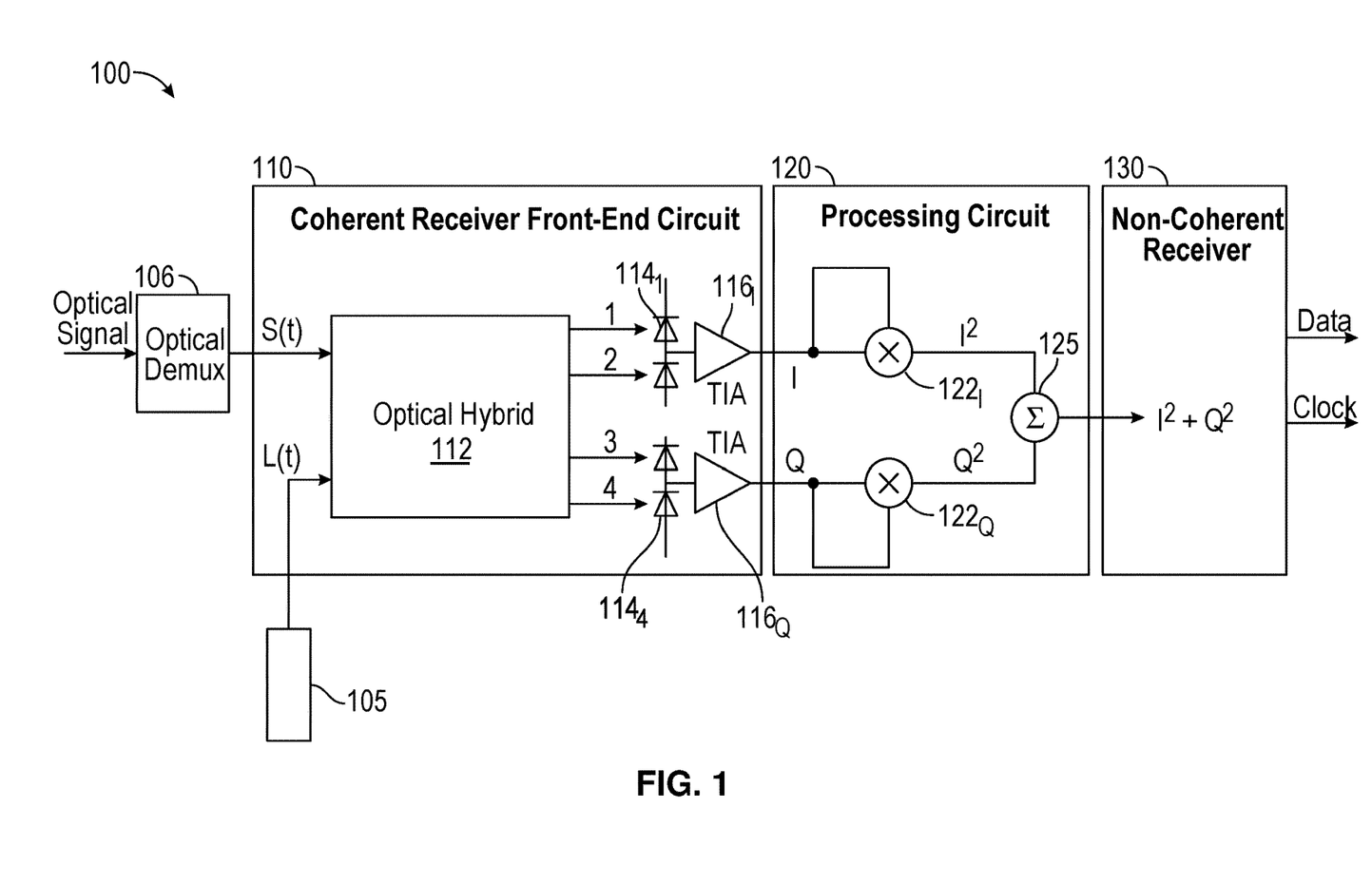
FIG. 1 is a block diagram of an optical receiver in accordance with an embodiment according to an example implementation.

Referring now to FIG. 1, shown is a block diagram of an optical receiver in accordance with an embodiment. More specifically as shown in FIG. 1, an optical receiver 100, which in different embodiments may be implemented as fully integrated circuitry, a collection of multiple integrated circuits (implemented in a single package or multiple packages), or as discrete circuitry, may be used to receive and process incoming optical information.

More specifically in the embodiment of FIG. 1, receiver 100 may receive an incoming optical signal from a given source. Although embodiments are not limited in this regard, the source may be an optical transmitter to which receiver 100 couples, e.g., via an optical fiber or other optical interconnect. Understand that the optical signal may be minimally processed before it is received in the circuitry shown in FIG. 1, such as by way of polarization processing, e.g., in a polarization beam splitter. Thus in the embodiment of FIG. 1, circuitry 100 corresponds to receiver circuitry of a single polarization, and identical circuitry of a polarization diversity receiver may be present for handling another polarization of the optical signal. In this way, each polarization state beats with the LO polarizations, and the resulting two branches can be summed together.

As illustrated, this incoming optical signal is received in an optical demultiplexer 106, which in a system providing Wavelength Division Multiplexing (WDM) can demultiplex multiple channels into individual channels for communication as an optical signal S(t) to a coherent receiver front-end circuit 110 (generically termed "front-end circuit" herein). Note that in other cases, demultiplexer 106 may not be present, such as for a single channel system. Note that in different implementations, a polarization beam splitter may be located before or after optical demultiplexer 106. For a given real world application a polarization diversity receiver may be implemented that splits an incoming signal in x and y polarizations (and thus would implement two receivers as in FIG. 1, one for x and one for y, with the resulting x and y signals combined. In another application, a polarization rotator may be provided that aligns the signal polarization such it is always the same as the LO. In such case, there may be only one receiver of FIG. 1, having a polarization rotator.

As further shown, front-end circuit 110 also receives an incoming local oscillator laser signal L(t), which may be received from a laser 105. In various embodiments, laser 105 may be a high power laser that provides a polarized local oscillator signal that can be used for coherent processing.

Front-end circuit 110 includes an optical hybrid 112 that receives the incoming signals, S(t) and L(t). Optical hybrid 112 may be configured to perform a mixing operation between these signals to generate an output electric field (E) at a plurality of ports (1-4) in accordance with Equations 1-4 below. The output electric field E at ports 1 to 4 are respectively given by:

$$E_1(t)=0.5(S(t)+L(t)), \quad (1)$$

$$E_2(t)=0.5(S(t)-L(t)), \quad (2)$$

$$E_3(t)=0.5(S(t)+jL(t)), \quad (3)$$

$$E_4(t)=0.5(S(t)-jL(t)). \quad (4)$$

Still referring to front-end circuit 110, the resulting electric field signals may further be processed using square-law detection and thereafter are provided to a plurality of photodiodes (PDs) 114₁-114₄. In an embodiment, photodiodes 114 may be implemented as balanced photodiodes that pass detected light in electrical current form to a pair of corresponding transimpedance amplifiers (TIAs) 116ᵢ, 116_Q, which receive these currents and convert them to voltage signals. More specifically, TIAs 116 output orthogonal voltage signals, including in-phase (I) signals and quadrature phase (Q) signals.

Thus the electrical current at the output of TIAs are for the in-phase (I) branch $$i_I(t)=R_{res} \text{Re}(S(t)L^*(t)) \quad (5)$$

and for the quadrature-phase (Q) branch $$i_q(t)=R_{res} \text{Im}(S(t)L^*(t)) \quad (6)$$

where Rres is the photodiode responsivity and "Re" and "Im" stand for real and imaginary parts.

Assuming the signals S(t) and the LO L(t) are given respectively by $$S(t)=\sqrt{P_S}s(t)\exp(-j\phi_S(t)) \quad (7)$$

and $$L(t)=\sqrt{P_L}l(t)\exp(-j\phi_L(t)) \quad (8)$$

where $P_S$ and $P_L$ are the average optical power of the signal and LO respectively, s(t) and l(t) are the normalized temporal amplitudes of the signal and LO respectively, and $\phi_S(t)$ and $\phi_L(t)$ are the temporal phases of the signal and LO respectively. The signal and LO lasers have random time fluctuating phases and $\phi_S(t)$ and $\phi_L(t)$ cannot be neglected. Using Equations (7) and (8), the current in branches I and Q can be calculated from Equations (5) and (6), which gives $$I(t)=R_{res}\sqrt{P_S P_L}s(t)\cos(\Delta(t)) \quad (9)$$

and $$Q(t)=R_{res}\sqrt{P_S P_L}s(t)\sin(\Delta(t)) \quad (10)$$

where $\Delta(t)=\phi_S(t)-\phi_L(t)$ is the residual temporal phase.

The basis of the coherent detection is shown in Equations (9) and (10) where the "cos" and "sin" functions indicate that I and Q are orthogonal. Since $\phi_s(t)$ and $\phi_L(t)$ are random, a conventional coherent detector tracks the phase $\Delta(t)$ (otherwise one of the signals I and Q will fade over time).

Instead embodiments square the signals I(t) and Q(t) and sum them. In this case, the resulting electrical power (proportional to current square) gives:

$$I^2(t)+Q^2(t)=R_{res}^2 P_S P_L s^2(t)((\cos \Delta(t))^2+(\sin \Delta(t))^2)= R_{res}^2 P_S P_L s^2(t) \quad (11)$$

From Equation (11), it is seen that the phase information is lost. This means that no temporal phase retrieval is needed. This also implies that no deterministic phase compensation is possible, and CD and PMD cannot be removed. However, embodiments may operate in the original (O)-band (wavelength in the 1300 nanometer (nm) region where all DC products are used). In this band CD is very low, and there is no need to compensate for CD. Moreover, for short reach applications (e.g., less than approximately 2 kilometers (km)), the PMD is low and compensation may be avoided without substantial performance degradation.

The gain of an embodiment compared to a conventional IM-DD detection scheme can be calculated by considering the performance of a conventional receiver where its electrical power (proportional to current $I^2_{conv}$) is given by $$I^2_{conv}(t)=R_{res}^2 P_s^2 s^2(t) \quad (12)$$

Therefore, the electrical power gain of an embodiment relative to a conventional IM-DD receiver is $$\text{Gain} = \frac{P_L}{P_S}. \quad (13)$$

A typical laser can generate LO power around $P_L=20$ milliwatts (mW) (13 dBm) and the received signal is $P_S=1$ mW (0 dBm) or lower, therefore the gain can be greater than 20 times (>13 dB), in an embodiment.

Back with reference to FIG. 1, complex signals are output from front-end circuit 110 and are provided to a processing circuit 120. In embodiments herein, processing circuit 120 may be implemented as a standalone circuit, or it can be implemented in an analog IC as part of TIAs 116 or in a receiver DSP with small complexity/power consumption. Regardless of implementation, processing circuit 120 may be configured to perform a square-sum mathematical operation. More specifically, processing circuitry 120 may generate squares of the individual IQ path signals and then sum the resulting squares. To this end as shown in the high level view of FIG. 1, processing circuitry 120 may include a first multiplier 122ᵢ and a second multiplier 122_Q. Understand while shown with respective feedback paths to realize the inputs for multipliers 122, various hardware configurations are possible.

The resulting squared signals are then summed in a summer 125 and are provided as a sum of squares signal, namely $I^2+Q^2$ (or root of this sum of squares value, in some embodiments) to a non-coherent receiver 130.

In embodiments herein, non-coherent receiver 130 may be implemented as an IM-DD receiver (which may be a CDR circuit) that obtains, from the received sum of squares information, data and a clock signal, shown being output from receiver 130. In different implementations, non-coherent receiver 130 may be implemented as an analog or digital receiver, and may in some implementations be a commercially available CDR module for IM-DD. And receiver 130 can be simplified without implementing CD or PMD compensation. Stated another way, a DSP or other non-coherent receiver circuit can be implemented without phase and frequency recovery loops, minimizing electrical power consumption. Understand while shown at this high level in the embodiment of FIG. 1, many variations and alternatives are possible.

Figure 2:
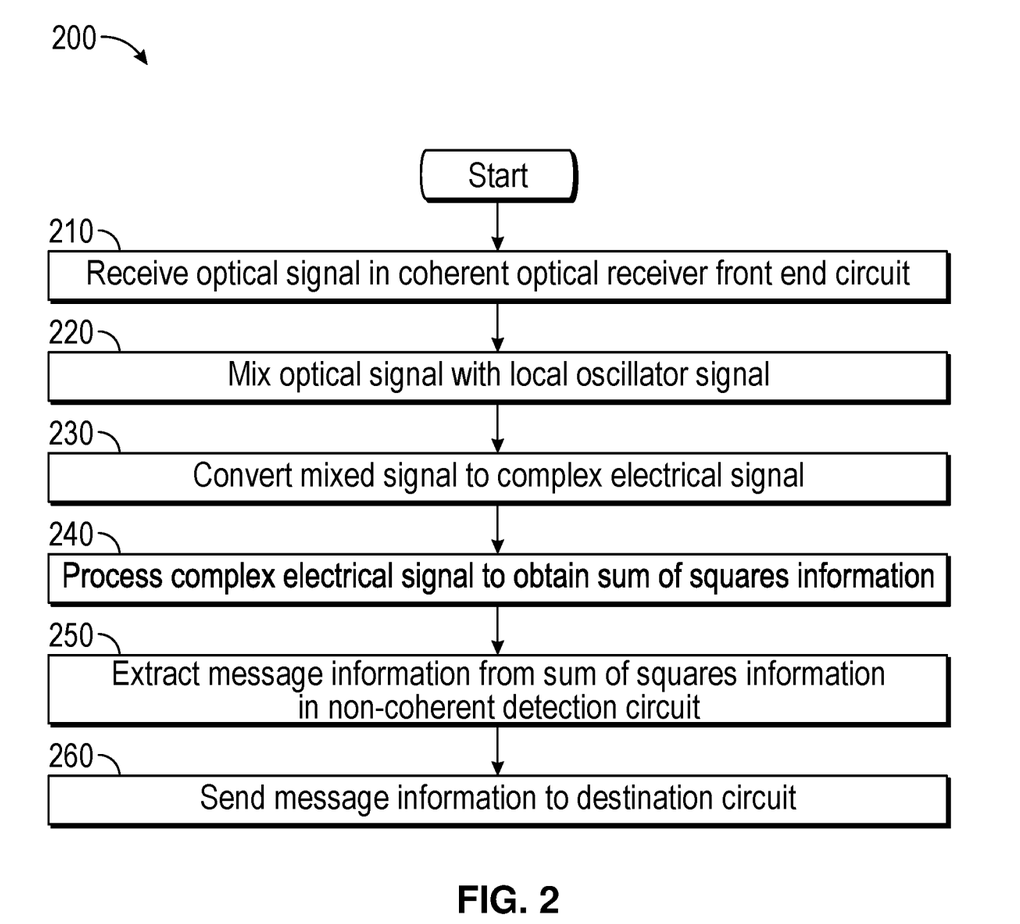
FIG. 2 is a flow diagram of a method in accordance with an embodiment according to an example implementation.

Referring now to FIG. 2, shown is a flow diagram of a method in accordance with an embodiment. In the high level shown in FIG. 2, method 200 is a method for processing incoming optical signals. In different embodiments, method 200 may be performed by hardware circuitry, such as dedicated optical receiver circuitry, standing alone and/or in combination with digital processing circuitry such as a DSP, firmware, software, and/or combinations thereof.

As shown, method 200 begins by receiving an optical signal in a coherent optical receiver front-end circuit (block 210). This front-end circuit may take the high level form shown in FIG. 1 as an example. Next, control passes to block 220 where the optical signal may be mixed with a local oscillator signal, namely a locally generated optical signal, such as may be generated by a laser source present within or coupled to the optical receiver. Thereafter, at block 230 the mixed signal that results from the mixing of the optical signal and the local oscillator signal may be converted to a complex electrical signal having in-phase and quadrature phase portions.

With further reference to FIG. 2, next at block 240 the complex electrical signal may be processed to obtain sum of squares information. In different implementations the sum of squares information may be calculated according to $I^2+Q^2$ or square root $I^2+Q^2$. In any case, the resulting sum of squares information may be provided to additional receiver circuitry such as a CDR to extract message information therefrom (block 250). Note that this information extraction may be performed in a non-coherent detection circuit that performs signal conditioning on electrical signals. With embodiments, a coherent detection circuit, with its concomitant further circuitry for performing CD compensation and PMD compensation, can be avoided. In this way, complexity and power consumption may be reduced while at the same time enabling operation at higher data rates. For example, embodiments may operate at data rates for 50 Gigabaud (Gbaud) and future DC applications at 100 Gbaud and beyond.

Finally with regard to FIG. 2, at block 260 this message information may be sent from the optical receiver to a destination circuit such as a local processing circuit, e.g., one or more cores of a system on chip (SoC), or so forth. Understand while shown at this high level in the embodiment of FIG. 2, many variations and alternatives are possible.

Figure 3A:
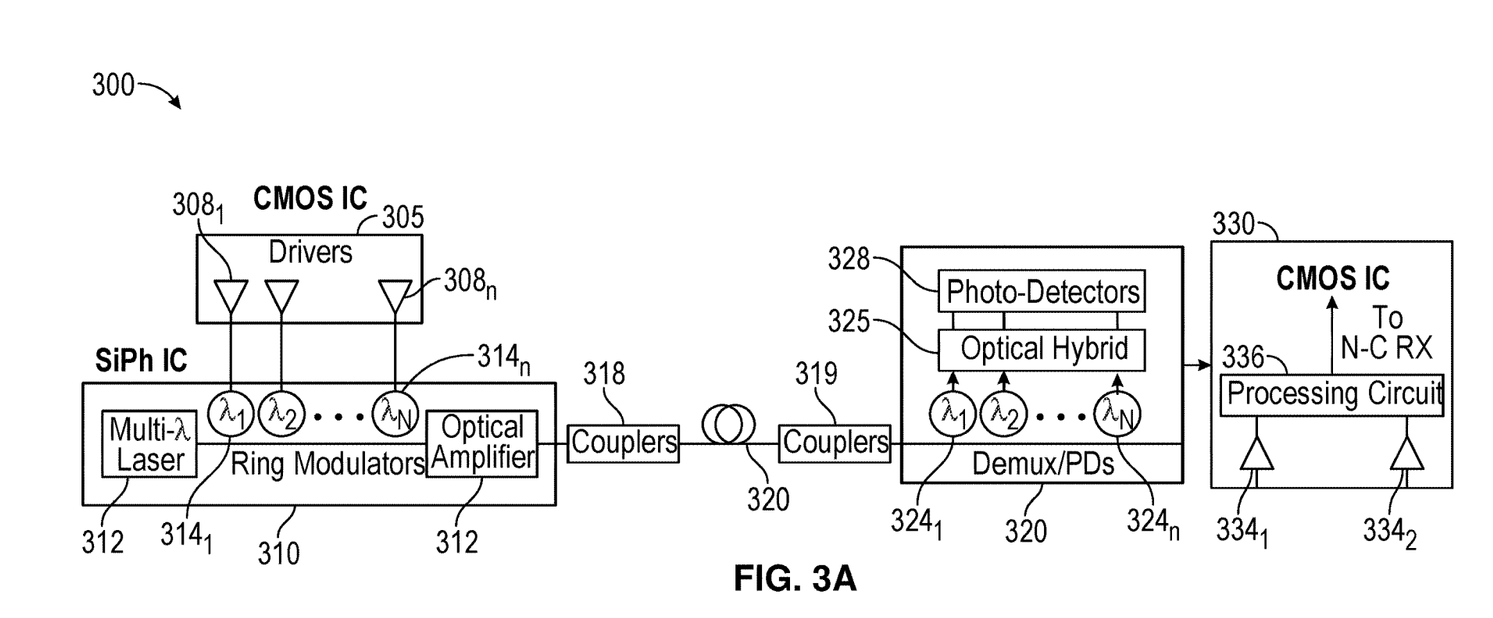
FIG. 3A is a block diagram of a system in accordance with an embodiment.

Referring now to FIG. 3A, shown is a block diagram of a system in accordance with an embodiment. As shown in FIG. 3A, system 300 may be any type of computing system, ranging from a small portable device to larger devices such as desktop computers, server computers, DC architectures or so forth.

In the high level shown in FIG. 3A, system 300 includes various electrical ICs and multiple photonic ICs. Specifically as shown, a first electrical IC 305, which may be implemented as a CMOS IC, includes a plurality of drivers $308_{1-n}$. Although embodiments are not limited in this regard, assume that IC 300 is a SoC or other processor. Drivers 308 may be implemented to receive incoming data or other information from a source circuit within IC 305, such as a processing core or other source circuit. In turn, drivers 308 communicate information electrically to a plurality of ring modulators $314_{1-n}$, which are adapted on a first silicon photonic (SiPh) IC 310. Photonic IC 310 includes transmitter circuitry including a multi-wavelength distributed feedback laser 312, to generate optical energy of multiple wavelengths. Of course in other implementations, a single modulator and single wavelength laser may be used.

Ring modulators 314 each may be configured to modulate incoming information onto a carrier optical signal of a given wavelength. In turn, the modulated optical signals are amplified in an optical amplifier 316, which may be implemented as a semiconductor optical amplifier (SOA).

Still with reference to FIG. 3A, the information communicated from IC 310 may be coupled via one or more couplers 318 to an optical interconnect 320, shown as one or more optical fibers. In turn, optical interconnect 320 couples, via another one or more couplers 319, to another SiPh IC 320, which in this illustration includes receiver circuitry. Specifically as shown, a plurality of demultiplexers $324_{1-n}$ are provided to recover the modulated optical information of a given wavelength, which may then be provided to an optical hybrid 325, and thereafter to photodetectors $328_{1-n}$ for conversion to electrical information that in turn is provided to another electrical IC 330. In an embodiment, second electrical IC 330, which may be implemented as a CMOS IC, includes a plurality of TIAs $334_{1-2}$. As seen, the outputs of TIAs 334 are provided to a processing circuit 336, which may perform the sum of squares operation described herein, among other operations. Although embodiments are not limited in this regard, IC 330 may be another SoC, a memory for IC 310 or another such electrical circuit. Understand while shown at this high level in the embodiment of FIG. 3A, many variations and alternatives are possible.

Figure 3B:
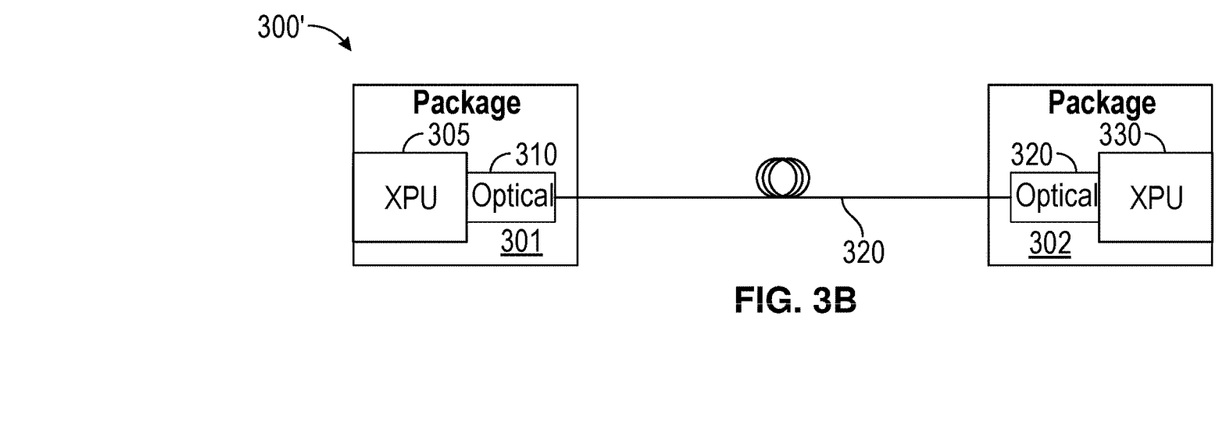
FIG. 3B is a block diagram of a system in accordance with another embodiment.

Referring now to FIG. 3B, shown is a block diagram of a system in accordance with another embodiment. As shown in FIG. 3B, system 300' may generally be configured the same as system 300 of FIG. 3A, and thus same numbering applies. In this implementation however, electrical and optical ICs are implemented in corresponding packages 301, 302 that are coupled via optical interconnect 320. Note that in various implementations, different manners of packaging CMOS and SiPh ICs may be realized, including commonly packaging multiple die of these ICs into a common package, such that a single package includes one or more CMOS die and one or more SiPh die.

Figure 4:
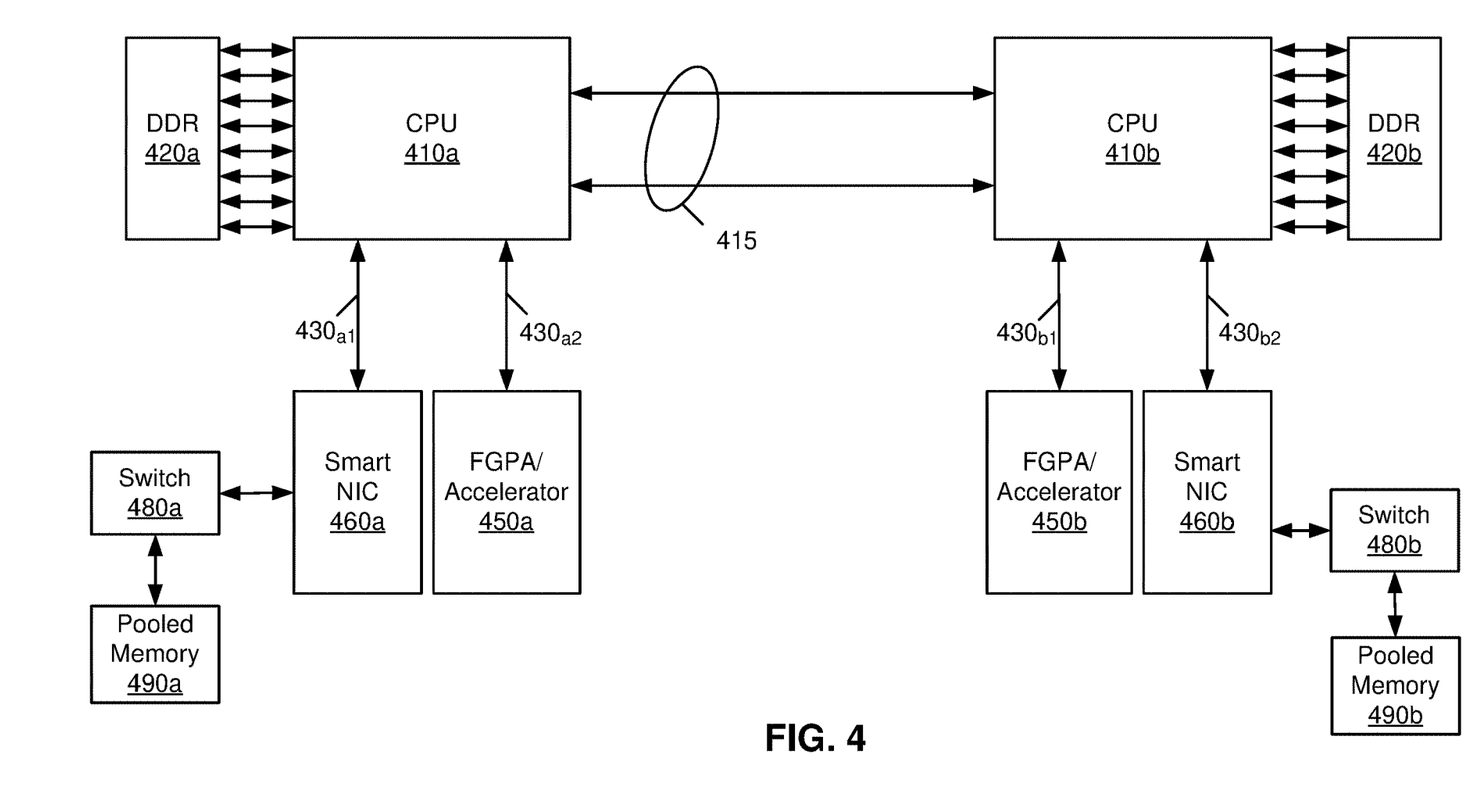
FIG. 4 is a block diagram of a system in accordance with another embodiment.

Embodiments may be implemented in a variety of other computing platforms. Referring now to FIG. 4, shown is a block diagram of a system in accordance with another embodiment. As shown in FIG. 4, a system 400 may be any type of computing device, and in one embodiment may be a server system such as an edge platform. In the embodiment of FIG. 4, system 400 includes multiple CPUs 410*a,b* that in turn couple to respective system memories 420*a,b* which in embodiments may be implemented as double data rate (DDR) memory. Note that CPUs 410 may couple together via an interconnect system 415, which in an embodiment can be an optical interconnect that communicates with optical circuitry (which may be included in or coupled to CPUs 410) including receiver circuitry having coherent and non-coherent components and processing circuitry as described herein.

To enable coherent accelerator devices and/or smart adapter devices to couple to CPUs 410 by way of potentially multiple communication protocols, a plurality of interconnects 430*a*1-*b*2 may be present. In an embodiment, each interconnect 430 may be a given instance of a Compute Express Link (CXL) interconnect.

In the embodiment shown, respective CPUs 410 couple to corresponding field programmable gate arrays (FPGAs)/accelerator devices 450*a,b*. In addition CPUs 410 also couple to smart network interface circuit (NIC) devices 460$a,b$. In turn, smart NIC devices 460$a,b$ couple to switches 480$a,b$ that in turn couple to a pooled memory 490$a,b$ such as a persistent memory.

Figure 5:
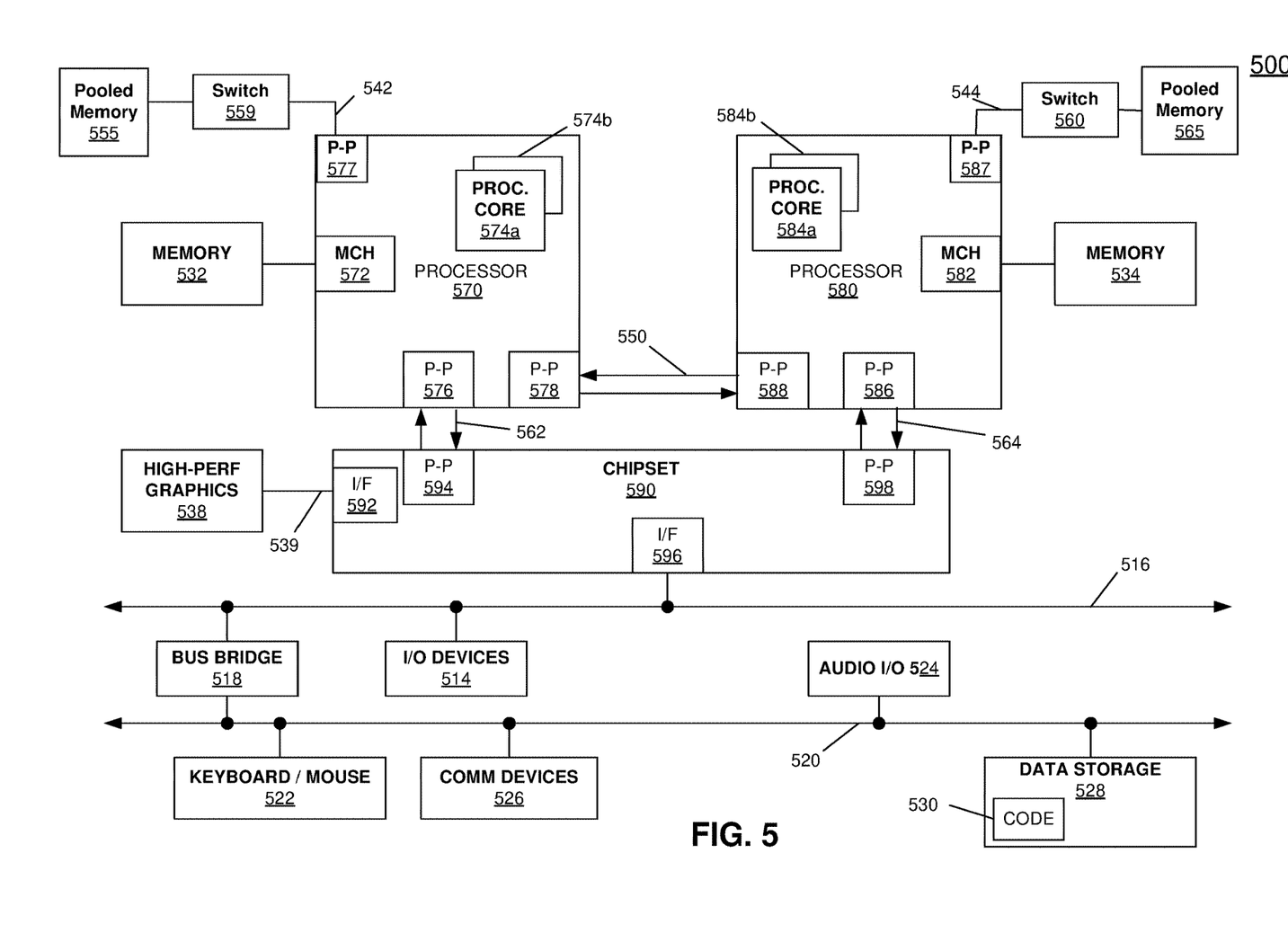
FIG. 5 is a block diagram of a system in accordance with yet another embodiment.

Referring now to FIG. 5, shown is a block diagram of a system in accordance with another embodiment. As shown in FIG. 5, multiprocessor system 500 includes a first processor 570 and a second processor 580 coupled via an interconnect 550, which in an embodiment can be an optical interconnect that communicates with optical circuitry (which may be included in or coupled to processors 570) including receiver circuitry having coherent and non-coherent components and processing circuitry as described herein. As shown in FIG. 5, each of processors 570 and 580 may be many core processors including representative first and second processor cores (i.e., processor cores 574$a$ and 574$b$ and processor cores 584$a$ and 584$b$).

In the embodiment of FIG. 5, processors 570 and 580 further include point-to point interconnects 577 and 587, which couple via interconnects 542 and 544 (which may be CXL buses) to switches 559 and 560. In turn, switches 559, 560 couple to pooled memories 555 and 565.

Still referring to FIG. 5, first processor 570 further includes a memory controller hub (MCH) 572 and point-to-point (P-P) interfaces 576 and 578. Similarly, second processor 580 includes a MCH 582 and P-P interfaces 586 and 588. As shown in FIG. 5, MCH's 572 and 582 couple the processors to respective memories, namely a memory 532 and a memory 534, which may be portions of system memory (e.g., DRAM) locally attached to the respective processors. First processor 570 and second processor 580 may be coupled to a chipset 590 via P-P interconnects 576 and 586, respectively. As shown in FIG. 5, chipset 590 includes P-P interfaces 594 and 598.

Furthermore, chipset 590 includes an interface 592 to couple chipset 590 with a high performance graphics engine 538, by a P-P interconnect 539. As shown in FIG. 5, various input/output (I/O) devices 514 may be coupled to first bus 516, along with a bus bridge 518 which couples first bus 516 to a second bus 520. Various devices may be coupled to second bus 520 including, for example, a keyboard/mouse 522, communication devices 526 and a data storage unit 528 such as a disk drive or other mass storage device which may include code 530, in one embodiment. Further, an audio I/O 524 may be coupled to second bus 520.

The following examples pertain to further embodiments.

In one example, an apparatus includes: a coherent optical receiver front-end circuit to receive an optical signal comprising information and further to receive a local oscillator optical signal, the coherent optical receiver front-end circuit to output an orthogonal electrical signal based on the optical signal; a processing circuit coupled to the coherent optical receiver front-end circuit to receive the orthogonal electrical signal and process the orthogonal electrical signal to generate therefrom sum of squares information; and a non-coherent receiver coupled to the processing circuit to recover the information from the sum of squares information.

In an example, the coherent optical receiver front-end circuit comprises an optical hybrid to receive the optical signal and the local oscillator optical signal and produce an optical electric field therefrom.

In an example, the apparatus further comprises: a plurality of photodetectors coupled to the optical hybrid to generate from the optical electric field a first current signal and a second current signal; and a plurality of transimpedance amplifiers coupled to the plurality of photodetectors, the plurality of transimpedance amplifiers to generate from the first and second current signals a first voltage signal and a second voltage signal.

In an example, the coherent optical receiver front-end circuit comprises the processing circuit.

In an example, the non-coherent receiver comprises the processing circuit, the non-coherent receiver comprising a clock and data recovery circuit.

In an example, the processing circuit is to generate the sum of squares information comprising a square root of a sum, the sum comprising a square of the first voltage signal and a square of the second voltage signal.

In an example, the processing circuit comprises: a first multiplier to multiply the first voltage signal with the first voltage signal to obtain the square of the first voltage signal; and a second multiplier to multiply the second voltage signal with the second voltage signal to obtain the square of the second voltage signal.

In an example, the apparatus further comprises an analog-to-digital converter coupled to the coherent optical receiver front-end circuit to receive and digitize the orthogonal electrical signal, wherein the processing circuit is to receive the digitized complex orthogonal signal and generate therefrom the sum of squares information.

In an example, the non-coherent receiver comprises a digital signal processor to recover the information without chromatic dispersion compensation or polarization mode dispersion compensation.

In an example, the apparatus further comprises an optical demultiplexer to receive a multi-channel optical signal and provide the optical signal to the coherent optical receiver front-end circuit.

In another example, a system comprises: a laser to generate a local oscillator optical signal; a coherent optical receiver front-end circuit coupled to the laser, the coherent optical receiver front-end circuit to receive an optical signal from a remote source and the local oscillator optical signal and output an in-phase electrical signal and a quadrature phase electrical signal; a circuit coupled to the coherent optical receiver front-end circuit to receive the in-phase electrical signal and generate therefrom a first square of the in-phase electrical signal and receive the quadrature phase electrical signal and generate therefrom a second square of quadrature phase electrical signal, the circuit to output a sum signal based on the first square and the second square; and an intensity modulation direct detector coupled to the circuit to recover, from the sum signal, data communicated via the optical signal.

In an example, the circuit is to generate the sum signal comprising a square root of a sum of the first square and the second square.

In an example, the coherent optical receiver front-end circuit is to mix the optical signal with the local oscillator optical signal to generate an electric field.

In an example, the coherent optical receiver front-end circuit comprises: a plurality of photodetectors to generate from the electric field a first current signal and a second current signal; and a plurality of transimpedance amplifiers coupled to the plurality of photodetectors, the plurality of transimpedance amplifiers to generate from the first and second current signals a first voltage signal and a second voltage signal.

In an example, the plurality of transimpedance amplifiers comprises the circuit.

In an example, the intensity modulation direct detector comprises the circuit, the intensity modulation direct detector comprising a clock and data recovery circuit.

In an example, the circuit is to generate the sum signal comprising $R_{res}^2 P_S P_L s^2(t)$, where $R_{res}$ is a photodiode responsivity, $P_S$ is a power of the optical signal, $P_L$ is a power of the local oscillator optical signal, and $s(t)$ is the optical signal.

In another example, a method comprises: receiving, in an optical receiver, an optical signal comprising information; mixing the optical signal with a local oscillator optical signal; converting the mixed optical signal to a complex electrical signal and processing the complex electrical signal to generate therefrom sum of squares information; and recovering the information from the sum of squares information.

In an example, generating the sum of squares information comprises: squaring a first voltage signal to obtain a square of the first voltage signal; squaring a second voltage signal to obtain a square of the second voltage signal; and summing the square of the first voltage signal and the square of the second voltage signal.

In an example, the method further comprises mixing the optical signal with the local oscillator optical signal in a coherent optical front-end of the optical receiver and recovering the information from the sum of squares information in a non-coherent receiver of the optical receiver.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

Understand that various combinations of the above examples are possible.

While the present disclosure has been described with respect to a limited number of implementations, those skilled in the art, having the benefit of this disclosure, will appreciate numerous modifications and variations therefrom. It is intended that the appended claims cover all such modifications and variations.

What is claimed is:

1. An apparatus comprising:
    a coherent optical receiver front-end circuit comprising an optical hybrid to receive an O-band optical data signal comprising Pulse Amplitude Modulation (PAM) encoded information and further to receive a local oscillator optical signal, the coherent optical receiver front-end circuit to output an orthogonal electrical signal comprising an in-phase signal and a quadrature phase signal based on the optical signals; and
    a processing circuit coupled to the coherent optical receiver front-end circuit to receive the orthogonal electrical signal and to convert the orthogonal electrical signal into sum of squares information lacking any phase information associated with the orthogonal electrical signal; and
    a non-coherent receiver comprising a clock and data recovery circuitry to recover the PAM encoded information from the sum of squares information in the absence of any phase information associated with the orthogonal electrical signal.

2. The apparatus of claim 1, wherein the coherent optical receiver front-end circuit further comprises:
    a plurality of balanced photodetectors coupled to the optical hybrid to generate from an output optical electric field a first current signal and a second current signal; and
    a plurality of transimpedance amplifiers coupled to the plurality of photodetectors, the plurality of transimpedance amplifiers to generate from the first and second current signals a first voltage signal and a second voltage signal.

3. The apparatus of claim 2, wherein the sum of squares information comprises a square of the first voltage signal and a square of the second voltage signal.

4. The apparatus of claim 3, wherein the processing circuit comprises:
    a first multiplier to multiply the first voltage signal with the first voltage signal to obtain the square of the first voltage signal; and
    a second multiplier to multiply the second voltage signal with the second voltage signal to obtain the square of the second voltage signal.

5. The apparatus of claim 1, wherein the sum of squares information consists essentially of a signal proportional to $R_{res}^2 P_S P_L s^2(t)$, and wherein $R_{res}$ is a photodiode responsivity, $P_S$ is a power of the optical data signal, $P_L$ is a power of the local oscillator optical signal, and $s(t)$ is the optical data signal.

6. The apparatus of claim 1, further comprising an analog-to-digital converter coupled to the coherent optical receiver front-end circuit to receive and digitize the orthogonal electrical signal, wherein the processing circuit is to receive the digitized orthogonal signal and to generate therefrom the sum of squares information.

7. The apparatus of claim 1, wherein the non-coherent receiver comprises a digital signal processor to recover the PAM encoded information without chromatic dispersion compensation or polarization mode dispersion compensation.

8. The apparatus of claim 1, further comprising an optical demultiplexer to receive a multi-channel O-band optical signal and provide the O-band optical data signal to the coherent optical receiver front-end circuit.

9. An optical short reach system comprising:
    an O-band laser to generate a local oscillator optical signal;
    a coherent optical receiver front-end circuit coupled to the laser, the coherent optical receiver front-end circuit to receive an optical data signal comprising pulse amplitude modulation (PAM) encoded information from a remote source within 2 kilometers of the receiver, and to receive the local oscillator optical signal and output an in-phase electrical signal and a quadrature phase electrical signal;
    a circuit coupled to the coherent optical receiver front-end circuit to receive the in-phase electrical signal and generate therefrom a first square of the in-phase electrical signal and to receive the quadrature phase electrical signal and generate therefrom a second square of the quadrature phase electrical signal, the circuit further to output a sum signal of the first square and the second square, wherein the sum signal comprises $R_{res}^2 P_S P_L s^2(t)$, and wherein $R_{res}$ is a photodiode responsivity, $P_S$ is a power of the optical signal, $P_L$ is a power of the local oscillator optical signal, and $s(t)$ is the optical signal; and
    a non-coherent receiver comprising a clock and data recovery circuit coupled to the circuit to recover, exclusively from the sum signal, the PAM encoded information communicated via the optical data signal.

10. The system of claim 9, wherein the circuit is to generate the sum signal comprising a square root of a sum of the first square and the second square.

11. The system of claim 9, wherein the coherent optical receiver front-end circuit is to mix the optical signal with the local oscillator optical signal to generate an electric field.

12. The system of claim 11, wherein the coherent optical receiver front-end circuit comprises:
   a plurality of balanced photodetectors to generate from the electric field a first current signal and a second current signal; and
   a plurality of transimpedance amplifiers coupled to the plurality of photodetectors, the plurality of transimpedance amplifiers to generate from the first and second current signals a first voltage signal and a second voltage signal.

13. The system of claim 12, wherein the plurality of transimpedance amplifiers comprises the circuit.

14. A short reach optical communication method, comprising:
   receiving, in an optical receiver, an O-band optical data signal comprising pulse amplitude modulation (PAM) encoded information;
   mixing, in a coherent optical front-end receiver, the optical data signal with a local oscillator optical signal;
   converting the mixed optical signal to a complex electrical signal comprising an in-phase signal and a quadrature phase signal;
   processing the complex electrical signal to generate therefrom sum of squares information lacking any phase information associated with the complex electrical signal; and
   recovering, with a non-coherent receiver, the PAM encoded information from the sum of squares information in the absence of any phase information associated with the complex electrical signal.

15. The method of claim 14, wherein generating the sum of squares information comprises:
   squaring a first voltage signal to obtain a square of the first voltage signal;
   squaring a second voltage signal to obtain a square of the second voltage signal; and
   summing the square of the first voltage signal and the square of the second voltage signal; and
   generating a signal proportional to $R_{res}\, P_S\, P_L\, S^2(t)$, and wherein $R_{res}$ is a photodiode responsivity, $P_S$ is a power of the optical signal, $P_L$ is a power of the local oscillator optical signal, and s(t) is the optical signal.

\* \* \* \* \*